June 23, 1936.  E. HOFFMAN  2,044,791
SPOOL AND PROTECTOR THEREFOR
Filed Aug. 22, 1931
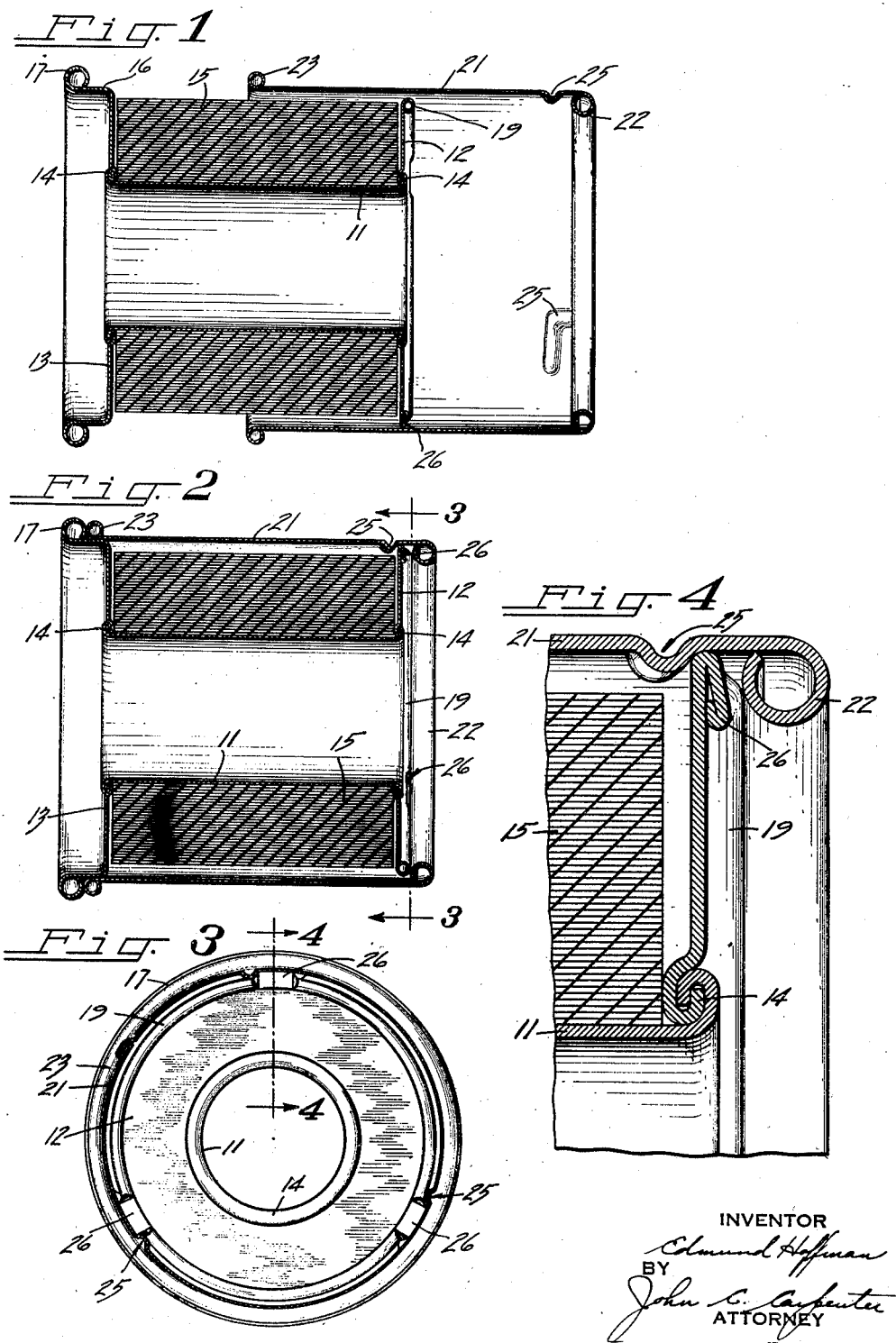
INVENTOR
Edmund Hoffman
BY
John C. Carpenter
ATTORNEY Patented June 23, 1936

2,044,791

UNITED STATES PATENT OFFICE 2,044,791

SPOOL AND PROTECTOR THEREFOR

Edmund Hoffman, Brooklyn, N. Y., assignor to American Can Company, New York, N. Y., a corporation of New Jersey Application August 22, 1931, Serial No. 558,746

4 Claims. (Cl. 206—52)

The present invention relates to a spool assembly and has particular reference to an improved construction wherein the spool may be retained in protected position within a protecting shell for storage and shipping purposes and when ready for use may be unlocked by simple rotation and withdrawn from the shell.

The principal object of the present invention is the provision of a spool adapted for telescopic engagement within a protecting shell, the spool being held in protected position by simple locking means.

An important object of the invention is an improved locking connection between a spool telescopically engaged within a protecting shell, this connection being provided by simple formation of the engageable parts.

Numerous other objects of the invention will be apparent as it is better understood from the following description, which, taken in connection with the accompanying drawing discloses a preferred embodiment thereof.

Referring to the drawing:

Figure 1 is a longitudinal sectional view of a spool and its protecting shell, the spool being shown as partially withdrawn from the shell;

Fig. 2 is a view similar to Fig. 1 illustrating the spool fully inserted and locked into protected position within the shell;

Fig. 3 is a transverse sectional view taken substantially along the line 3—3 in Fig. 2 and illustrating the inserted spool in end elevation; and Fig. 4 is an enlarged sectional detail of one corner of the shell and spool, this view showing the parts in inter-locked position.

The spool assembly unit illustrated in the drawing as a preferred exemplification of the invention, comprises a spool core member 11 having fixed heads 12 and 13 secured to its ends in any suitable manner, as by interfolded seams 14. Tape 15 or other suitable material for use of which the spool is intended, is wound on the core 11 and between the fixed heads 12 and 13 in the usual manner. The head 13 is outwardly extended by being drawn into a smooth cylindrical wall 16 which is terminated in a curled peripheral edge 17. This curled edge 17 provides a hand grip for the spool so that it may be easily inserted and withdrawn from its protecting shell. The head 12 of the spool is preferably spun over in a curled edge 19.

The protecting shell for the spool comprises a tubular open-ended body 21 having one edge bent inwardly in a curl 22. The edge of the shell at its opposite end is bent outwardly in a curled edge 23, the edges 22, 23 enclosing the raw edges of the metal composing the shell and providing smooth surfaces at its open ends.

The spool containing its tape or other material is telescopically inserted endwise into the shell and through the open end adjacent the curled edge 23. The cylindrical wall 16 of the head passes inside of and frictionally engages the inner wall of the shell, the projected curled edge 17 of the head 13 being brought practically into engagement with the curled edge 23 of the shell, (Fig. 2). In this inserted position, the curl 19 of the spool head 12 practically engages the end curl 22 of the shell 21.

From its inserted position the spool is given a partial turn within the shell or the shell may be turned on the spool and this action forcibly locks the shell and spool together. The locked position is the protected position for the spool, the spool being forced a slight distance longitudinally of its shell so as to tightly engage the curl parts 17, 23 and the curled parts 19, 22. Resiliency in the heads 12, 13 permit a close clamping action and dirt and other contamination of the spool is avoided during its periods of non-use. This locking feature will now be described.

The outer wall of the shell 21 is pressed inwardly at spaced positions to provide inwardly projecting ridges 25 inclined circumferentially of the shell. This constitutes one of the locking elements. To provide the other locking element, the curling head 12 of the spool is flattened at spaced intervals to provide outwardly projecting locking lugs 26. The normal diameter of the curl 19 is small enough to freely pass inside of the ridges 25 but this diameter is increased by and at the flattening of the lugs 26 (Fig. 3). The angular spaced intervals of the lugs 26 of the spool corresponds with the angular spaced intervals of the ridges 25 of the shell and as the spool is inserted the lugs 26 are held out of alignment with the ridges 25 until the lugs 26 have passed inward through the spaces between the ridges 25 and the spool has reached its inserted position.

Slight rotation is then given the spool within its shell or the shell on its enclosed spool and the lugs 26 are moved back of and along the inclined walls of the bayonet ridges 25. This draws the spool into the closed and protected position previously referred to, so that its curled edges 19 and 17 tightly engage the corresponding shell edges 22, 23.

When the spool is to be used it is removed from its protecting shell by first slightly turning it or the shell in reverse direction until the lugs 26 move out of their engagement with the inclined walls of the ridges 25. The spool is then free within the shell, being held merely by the friction wall 16, and may then be fully drawn out. The tape or other material on the spool can then be used as desired and the spool with its unused tape can be repeatedly replaced in the shell as desired.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A spool and protector assembly, comprising a spool having fixed heads one of which is provided with an exterior hand grip the other having a curled peripheral edge flattened at spaced intervals into projecting locking lugs, and a protecting shell adapted to enclose said spool and having inclined ridges formed in its wall adjacent one end and adapted to engage said locking lugs when said spool is inserted within said shell whereby partial rotation between spool and shell engages and disengages said lugs and ridges and locks and unlocks said spool in its protected position.

2. A spool and protector assembly, comprising a spool having fixed heads one of which is provided with a cylindrical friction wall extending outwardly in a projecting curled hand grip, a protecting shell adapted to telescopically receive and enclose said spool with said cylindrical wall in frictional engagement, and an inclined joint connection formed in said spool and shell at the end opposite said grip end for locking said spool in enclosed and protected position within said shell, said joint connection comprising spaced lugs on the inner spool head and inwardly pressed ridges on said shell, said ridges extending nearly parallel with said inner spool head.

3. A spool and protector assembly, comprising a spool element having fixed heads one of which is provided with an exterior hand grip, a protecting shell element having an outer entrance end of uniform diameter throughout and adapted to receive and enclose said spool in any circumferential position of the latter relative to the shell, and interlocking devices formed in the inner end of the said shell and in the other head of said spool for removably securing the spool in protected position, said interlocking devices comprising spaced outward projections on the spool head and spaced inward projections on the shell, the spaced projections having means to draw the heads of said spool into tight engagement with the ends of said shell on relative rotation of said elements after assembly.

4. A spool and protector assembly, comprising a spool element having fixed heads one of which is provided with an exterior hand grip, the other of said heads being flattened at spaced intervals to provide projecting spaced locking members, and a protecting shell element having an entrance end of uniform diameter throughout adapted to receive and enclose said spool in any circumferential position of the latter relative to the shell, and having spaced locking members formed in its wall at the end remote from the entrance end which are adapted to cooperate with the locking members on said spool when said spool is inserted and rotated, the spaced locking members on one of said elements being inclined whereby the heads of said spool are drawn into tight engagement with the ends of said shell by relative rotation of said elements to effect locking engagement between said spool and shell elements.

EDMUND HOFFMAN.